H. SCHNEIDER.
PROCESS OF LEACHING OUT HOPS.
APPLICATION FILED AUG. 17, 1912.
1,232,098.
Patented July 3, 1917.
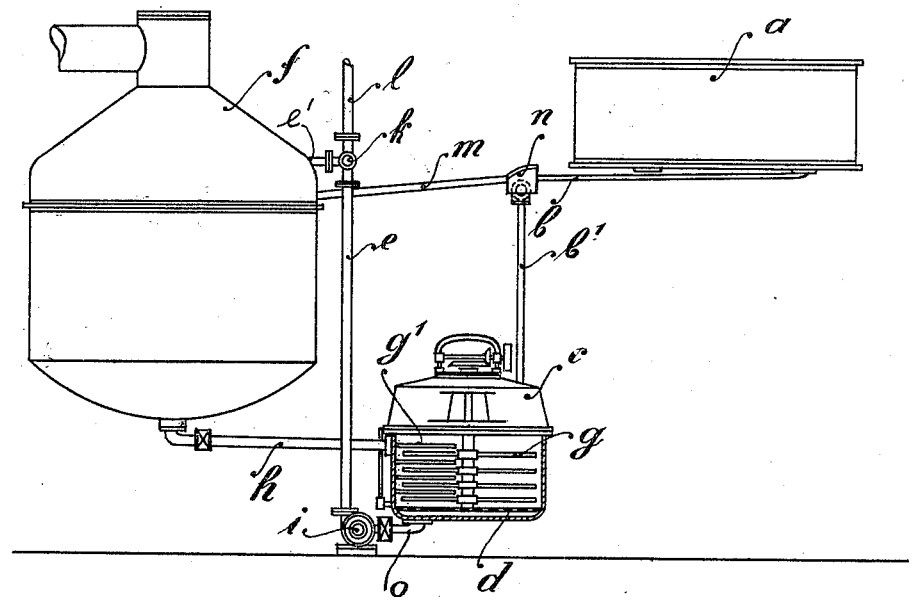
Witnesses:
Inventor:
Heinrich Schneider

UNITED STATES PATENT OFFICE.

HEINRICH SCHNEIDER, OF ESSEN-ON-THE-RUHR, GERMANY.

PROCESS OF LEACHING OUT HOPS.

1,232,098.  Specification of Letters Patent.  Patented July 3, 1917.

Application filed August 17, 1912. Serial No. 715,646.

*To all whom it may concern:*

Be it known that I, HEINRICH SCHNEIDER, a citizen of German Empire, residing at Essen-on-the-Ruhr, Germany, have invented new and useful Improvements in Processes of Leaching Out Hops, of which the following is a specification.

The object of the present invention is a process of leaching hops in a hop extracting apparatus provided with a strainer and stirring device, but passing the wort and after-wort through the hops on their way between the refining vat and the copper.

Similar processes are known which consist in leaching the hops in a cooker provided between the refining vat and the copper during the passing of the wort and after-wort by cooking, however, these processes do not result in fully and perfectly extracting all valuable ingredients of the hops and moreover, the cooking process extracted also the bitter, tart and disagreeable ingredients from the strands, ribs and seeds of the hops which are harmful to the taste of the beer.

It has furthermore been proposed to leach the hops without cooking the same by means of water or a weak wort avoiding the cooking, however, also these methods do not result in the perfect extraction of all of the useful ingredients and flavors contained in the hops because they all require that the hops after having been pressed be subjected to a second digestion and be added to the mash after the third treatment by the wort or water.

All these disadvantages are avoided by the process according to the present invention, which is carried into practice by means of the apparatus illustrated in the accompanying drawing, which comprises a vat $a$ for the wort arranged at a suitable height above a hop-jack $c$ with which it is connected by conduits $b$, $b'$. Said jack is provided with a sieve bottom $d$ suitably spaced from the bottom proper which latter is connected by a valved conduit $o$ with a pump $i$ to which a vertical conduit $e$ is secured having near its upper end a two way cock $k$. A conduit $e'$ leads from said cock to the copper $f$ and another conduit $l$ to a cooler, not shown in the drawing. The copper $f$ is connected by means of a conduit $m$ with a suitable valve $n$ with the vat $a$ and the valve $n$ controls the communications between conduits $m$, $b$ and $b'$. Within the jack $c$ an agitator $g$, $g'$ is provided adapted to disintegrate any hops contained in said jack. The worts and after-worts are passed at the running off temperature from the vat $a$ through the hop jack $c$ in a slow stream from where they are pumped into the copper $f$ while the hops in the jack are continuously beaten by the stirrer which results in their disintegration, while the worts and after-worts can also be passed at the running-off temperature from vat $a$ through the conduit $m$ into the copper $f$ where they are boiled with the beer contained therein and then passed into the hop-jack $c$ in which they are continuously beaten by the stirrer $g$ $g'$ in order to thoroughly disintegrate the hops contained in the jack and from where they are pumped by the pump $i$ through the conduit $e$ to a suitable cooler.

I claim:

Process of hopping beer consisting in passing the wort at the "running off" temperature through a hop jack in a slow stream, continuously beating it and then pumping it into the copper, then passing the after-wort into the copper and boiling it together with the beer contained therein, passing it again through the hop-jack and finally pumping it to a cooler, substantially as described.

In testimony whereof I have signed my name to this specification in the presence of two subscribing witnesses.

HEINRICH SCHNEIDER. [L. S.]

Witnesses:
 HELEN NUFER,
 ALBERT NUFER.

Copies of this patent may be obtained for five cents each, by addressing the "Commissioner of Patents, Washington, D. C."